(12) United States Patent
Andersen et al.

(10) Patent No.: US 11,990,714 B2
(45) Date of Patent: May 21, 2024

(54) ELECTRICAL RECEPTACLE ASSEMBLY WITH OUTWARD-BIASING FACEPLATE

(71) Applicant: Lutron Technology Company LLC, Coopersburg, PA (US)

(72) Inventors: Adam J. Andersen, Allentown, PA (US); Brad Michael Kreschollek, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/833,542

(22) Filed: Jun. 6, 2022

(65) Prior Publication Data

US 2022/0376445 A1 Nov. 24, 2022

Related U.S. Application Data

(63) Continuation of application No. 16/916,486, filed on Jun. 30, 2020, now Pat. No. 11,355,891, which is a continuation of application No. 16/354,661, filed on Mar. 15, 2019, now Pat. No. 10,714,879, which is a continuation of application No. 15/475,888, filed on Mar. 31, 2017, now Pat. No. 10,249,993.

(60) Provisional application No. 62/316,844, filed on Apr. 1, 2016.

(51) Int. Cl.
*H01R 13/74* (2006.01)
*H02G 3/14* (2006.01)

(52) U.S. Cl.
CPC ............... *H01R 13/74* (2013.01); *H02G 3/14* (2013.01)

(58) Field of Classification Search
None
See application file for complete search history.

(56) References Cited

U.S. PATENT DOCUMENTS

| | | |
|---|---|---|
| 3,953,933 A | 5/1976 | Goldstein et al. |
| 4,030,797 A | 6/1977 | Nieman |
| 4,835,343 A | 5/1989 | Graef et al. |
| 4,840,584 A | 6/1989 | Cox et al. |
| 4,909,748 A | 3/1990 | Kozono et al. |
| 4,998,635 A | 3/1991 | Vink et al. |
| 5,146,056 A | 9/1992 | Kuczynski et al. |
| 5,180,886 A | 1/1993 | Dierenbach et al. |
| 5,191,971 A | 3/1993 | Hakkarainen et al. |
| 5,641,294 A | 6/1997 | Beard |
| 5,755,584 A | 5/1998 | Ozaki et al. |
| 5,980,291 A | 11/1999 | Ono et al. |
| 5,997,328 A | 12/1999 | Kodama et al. |
| 6,033,247 A | 3/2000 | Gregory et al. |

(Continued)

FOREIGN PATENT DOCUMENTS

| | | |
|---|---|---|
| CN | 204230530 U | 3/2015 |
| CN | 204517064 U | 7/2015 |

(Continued)

*Primary Examiner* — Oscar C Jimenez
(74) *Attorney, Agent, or Firm* — Michael S. Czarnecki; Glen R. Farbanish; Philip N. Smith (57) ABSTRACT

A faceplate assembly may include a faceplate having an opening configured to receive an electrical device insert, and an adapter that is disposed between the faceplate and a structure. The adapter may about a surface of the structure. The one or more biasing members may apply forces against the faceplate that may cause the faceplate to be biased outward relative to the surface of the structure.

15 Claims, 8 Drawing Sheets

(56) References Cited

U.S. PATENT DOCUMENTS

| | | | |
|---|---|---|---|
| 6,039,602 A | 3/2000 | Witkowski et al. | |
| 6,174,185 B1 | 1/2001 | Cecil et al. | |
| 6,281,440 B1 | 8/2001 | Baldwin et al. | |
| 6,435,890 B2 | 8/2002 | Kato et al. | |
| 7,540,768 B1 | 6/2009 | Wang et al. | |
| 8,445,780 B1 | 5/2013 | Robins et al. | |
| 9,101,051 B1 | 8/2015 | Ferrara et al. | |
| 10,249,993 B2 * | 4/2019 | Andersen | H02G 3/14 |
| 10,714,879 B2 * | 7/2020 | Andersen | H01R 13/74 |
| 11,355,891 B2 * | 6/2022 | Andersen | H02G 3/14 |
| 2002/0127897 A1 | 9/2002 | Sharples | |
| 2009/0137145 A1 | 5/2009 | Arts et al. | |
| 2009/0249705 A1 | 10/2009 | Struthers et al. | |
| 2009/0314509 A1 | 12/2009 | Eshelman et al. | |
| 2009/0317999 A1 | 12/2009 | Arts et al. | |
| 2010/0132972 A1 | 6/2010 | Chaumeny et al. | |
| 2010/0210129 A1 | 8/2010 | Arts et al. | |
| 2011/0056743 A1 | 3/2011 | Solan | |
| 2011/0155413 A1 | 6/2011 | Eshelman et al. | |
| 2013/0065415 A1 | 3/2013 | Van et al. | |
| 2014/0102779 A1 | 4/2014 | Solan et al. | |
| 2014/0134875 A1 | 5/2014 | Van Swearingen et al. | |
| 2015/0001361 A1 | 1/2015 | Rogers et al. | |
| 2016/0013626 A1 | 1/2016 | Gage | |
| 2017/0278647 A1 | 9/2017 | Dimberg et al. | |

FOREIGN PATENT DOCUMENTS

| | | |
|---|---|---|
| CN | 105161902 A | 12/2015 |
| DE | 102008015129 B3 | 7/2009 |
| DE | 102008017541 A1 | 10/2009 |
| EP | 0935326 A2 | 8/1999 |
| EP | 2518848 A1 | 10/2012 |
| GB | 2501682 A | 11/2013 |
| WO | 2008074311 A2 | 6/2008 |

* cited by examiner

ELECTRICAL RECEPTACLE ASSEMBLY WITH OUTWARD-BIASING FACEPLATE

CROSS REFERENCE TO RELATED APPLICATIONS

This application is a continuation of U.S. patent application Ser. No. 16/916,486, filed on Jun. 20, 2020, which is a continuation of U.S. patent application Ser. No. 16/354,661, filed Mar. 15, 2019, now U.S. Pat. No. 10,714,879, issued on Jul. 14, 2020, which is a continuation of U.S. patent application Ser. No. 15/475,888, filed Mar. 31, 2017, now U.S. Pat. No. 10,249,993, issued on Apr. 2, 2019, which claims the benefit of provisional U.S. Patent Application No. 62/316,844, filed Apr. 1, 2016, the disclosures of which are incorporated herein by reference in their entireties.

BACKGROUND

In accordance with an electrical receptacle assembly installation, an electrical receptacle may be fixed to a structure, such as a yoke installed in a wall opening, such that the electrical receptacle protrudes outward beyond a surface of the wall. In such an installation, it may be desirable to attach a faceplate to the electrical receptacle, such that the faceplate appears to "float" relative to the wall. However, anomalies in the surface of the wall and/or other structural complications may hinder the alignment of corresponding surfaces of the electrical receptacle and the faceplate, and further may inhibit maintenance of the alignment of such surfaces.

SUMMARY

As described herein, an example faceplate assembly may include a faceplate that defines an opening that is configured to receive an electrical device insert. The faceplate assembly may include an adapter that is configured to be disposed between the faceplate and a structure to which the faceplate assembly is installed, such as an interior wall. The adapter may be configured to at least partially surround a portion of the electrical device insert. The adapter may be further configured to abut a surface of the structure.

The one or more biasing members may apply biasing forces against an inner surface of the faceplate. These forces may cause the faceplate to be biased outward relative to the surface of the structure, for instance such that the faceplate abuts the electrical device insert. This may allow the faceplate assembly to compensate for one or more anomalies of the surface of the structure, while maintaining parallel alignment between corresponding outer surfaces of the faceplate and the electrical device insert.

DETAILED DESCRIPTION

Figure 1:
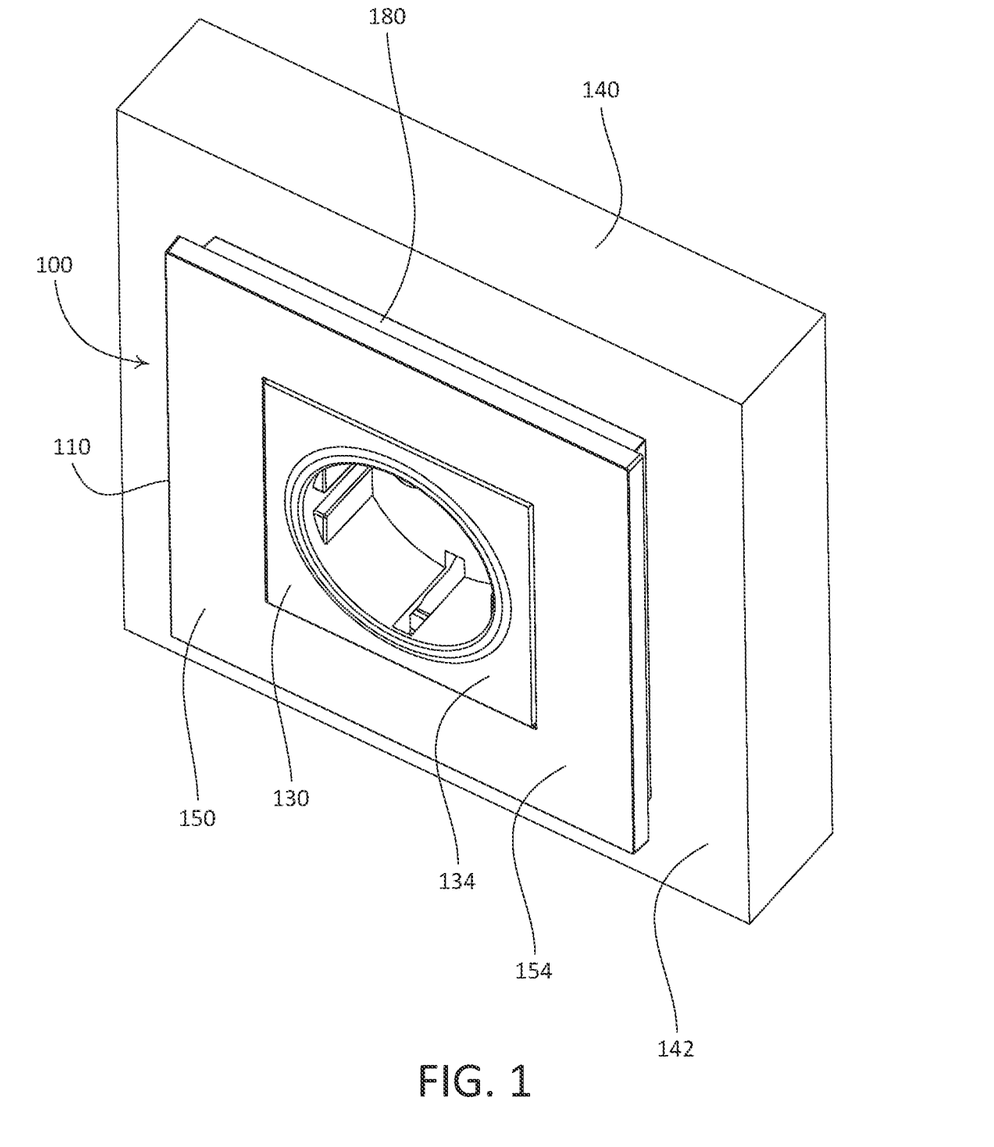
FIG. 1 is a perspective view of an example electrical receptacle assembly that includes an outward-biased faceplate assembly.
Figure 2:
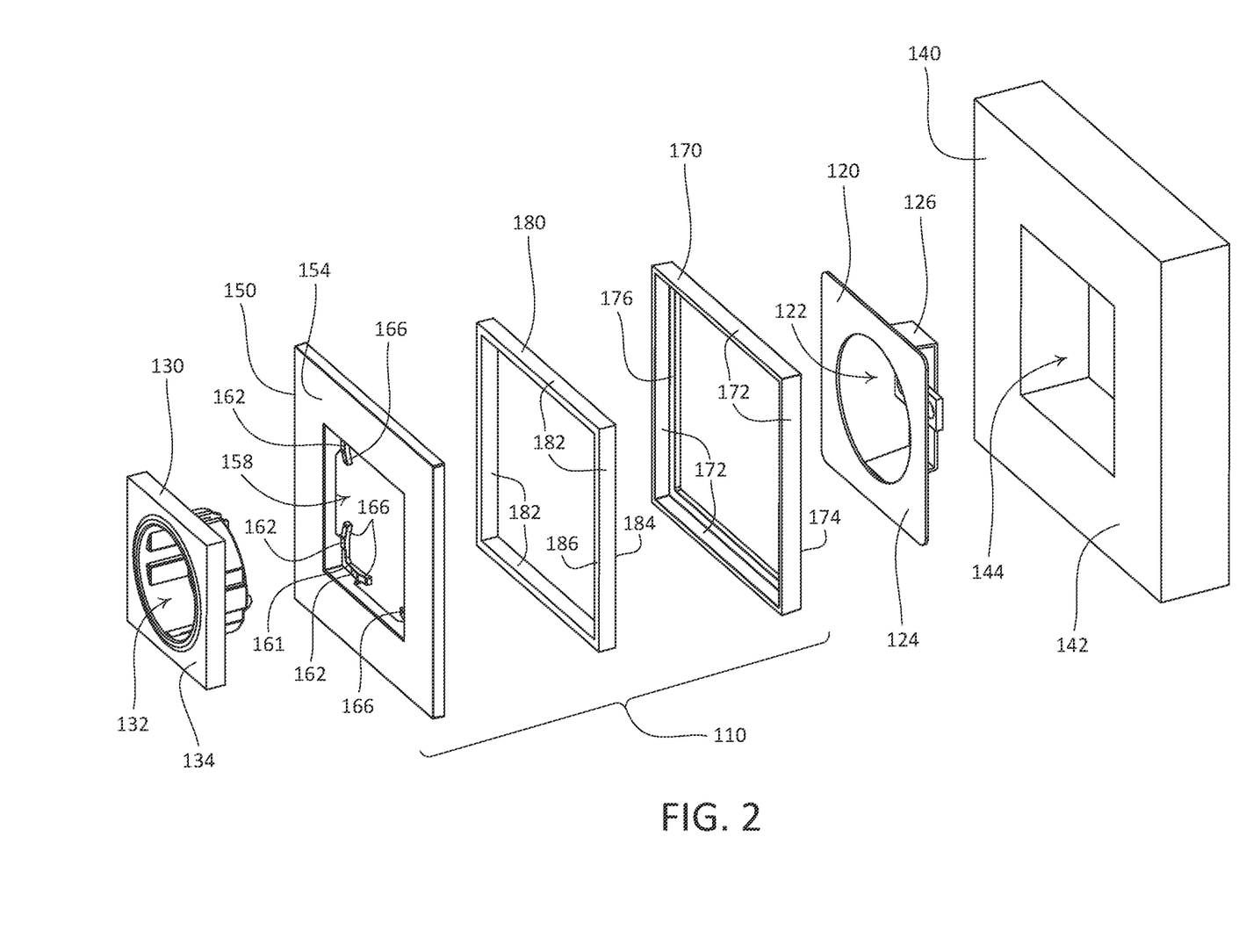
FIG. 2 is an exploded view of the example electrical receptacle assembly illustrated in FIG. 1.
Figure 3A:
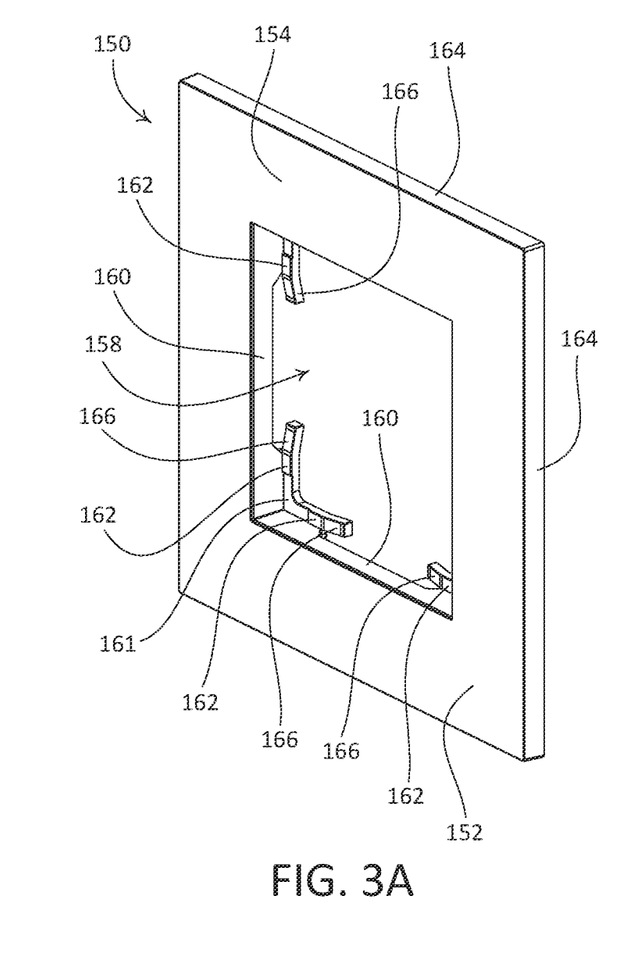
FIG. 3A is a perspective view of the front of a faceplate of the example electrical receptacle assembly illustrated in FIG. 1.
Figure 3B:
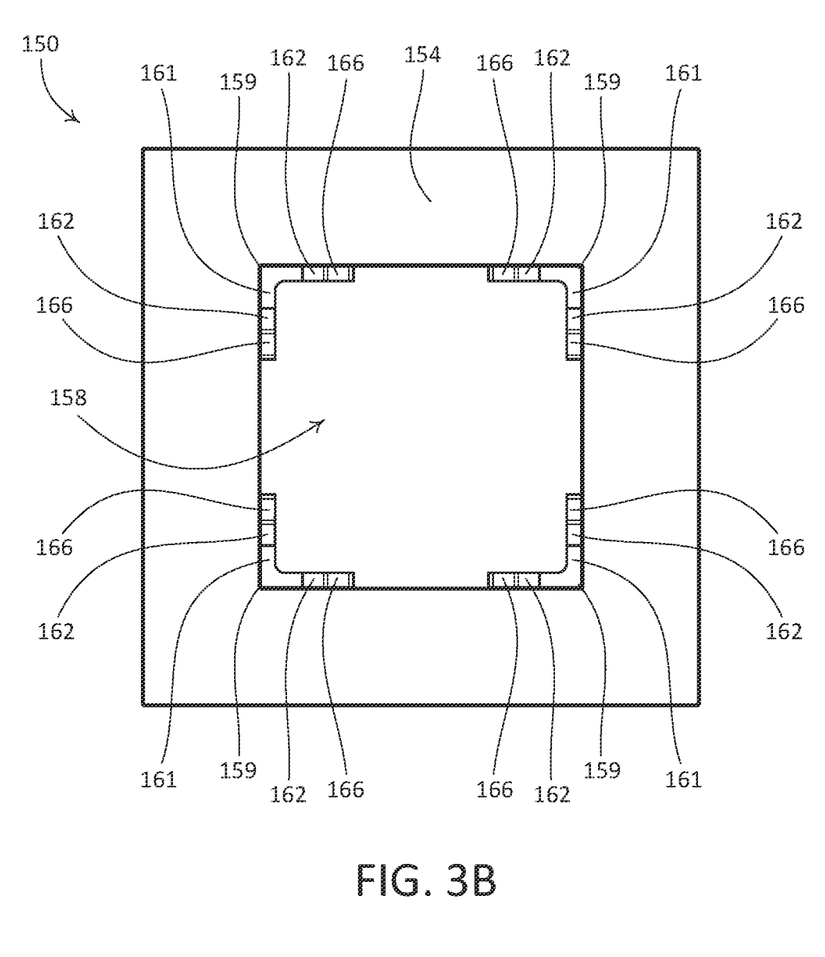
FIG. 3B is a front view of the faceplate of the example electrical receptacle assembly illustrated in FIG. 1.
Figure 3C:
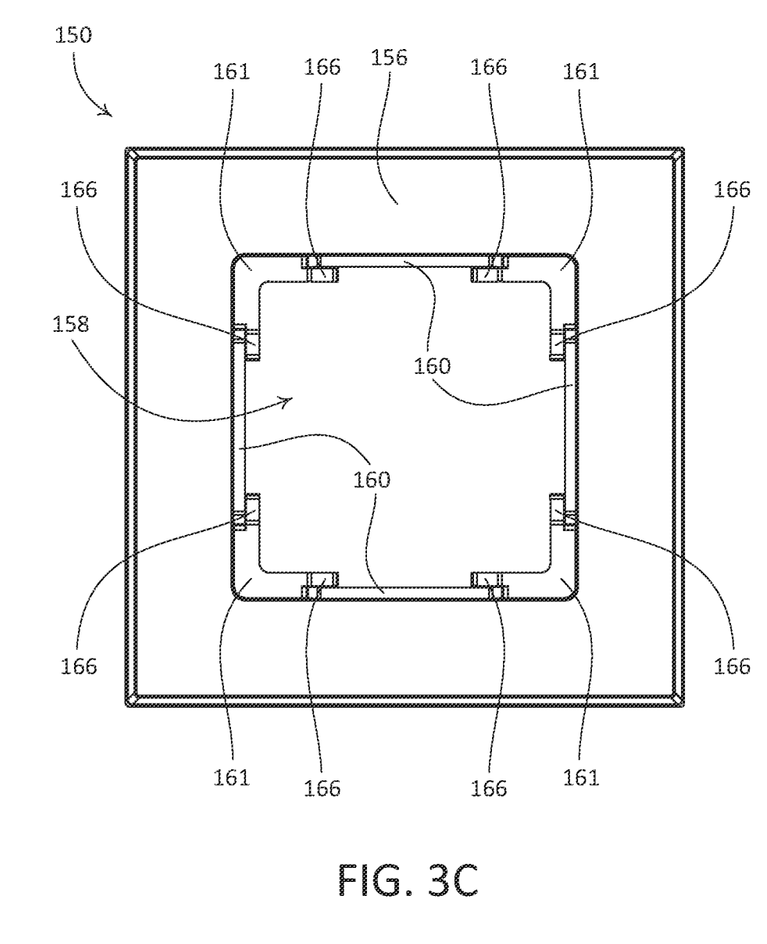
FIG. 3C is a rear view of the faceplate of the example electrical receptacle assembly illustrated in FIG. 1.
Figure 3D:
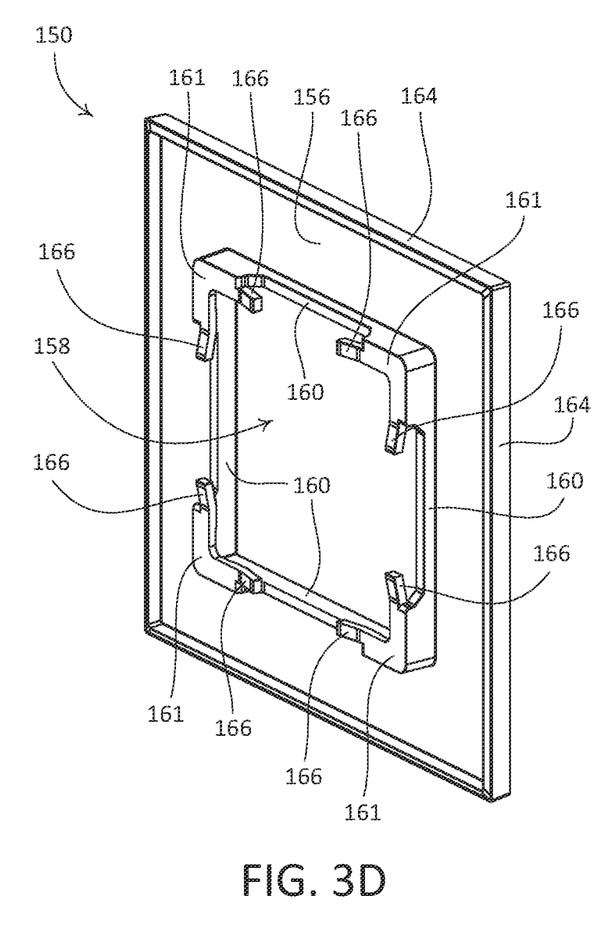
FIG. 3D is a perspective view of the rear of the faceplate of the example electrical receptacle assembly illustrated in FIG. 1.
Figure 3E:
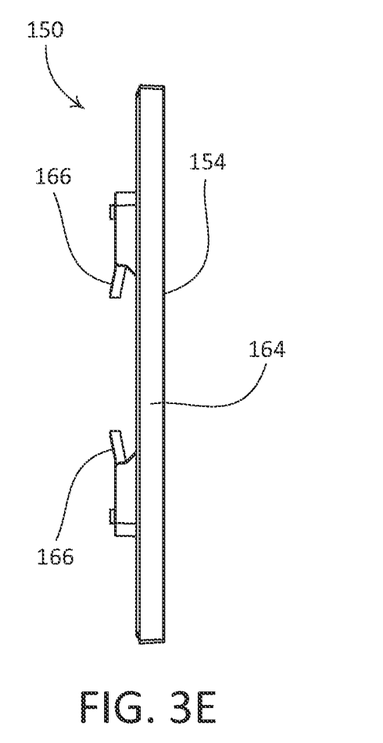
FIGS. 3E-3H are left, top, right, and bottom views, respectively, of the faceplate of the example electrical receptacle assembly illustrated in FIG. 1.
Figure 3F:
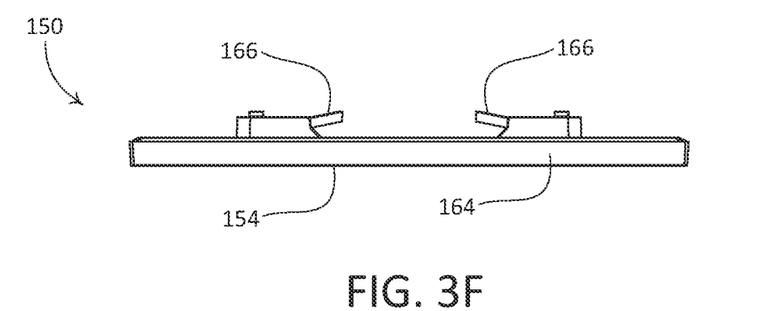
Figure 3G:
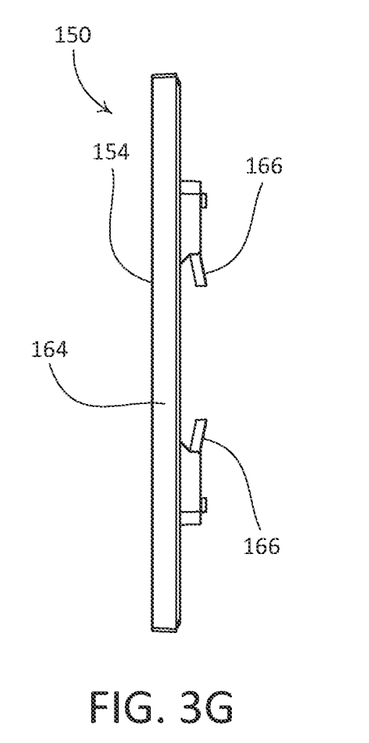
Figure 3H:
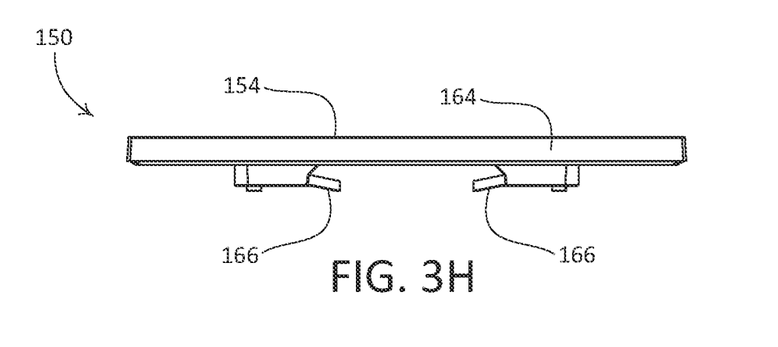

FIGS. 1 and 2 depict an example electrical receptacle assembly 100. As shown, the electrical receptacle assembly 100 may include an example faceplate assembly 110, a yoke 120, and an electrical device insert 130. The electrical receptacle assembly 100 may be installed in a structure, such as a wall 140 or other structure. Wall 140 may be, for example, an interior wall of a building. The structure may define a surface which may be abutted by one or more components of the electrical receptacle assembly 100. For example, as shown, the wall 140 defines a surface 142.

The yoke 120 may be installed in the structure. For example, the illustrated wall 140 defines an opening 144 into which the yoke 120 may be installed. The yoke 120 may define an opening 122 that is configured to at least partially receive the electrical device insert 130. The yoke 120 may further define a collar 124 that is sized larger than the opening 144 in the wall 140, such that one or more portions of the collar 124 abut the surface 142 of the wall 140 when the yoke 120 is installed in the opening 144.

The electrical device insert 130 may define a cavity 132 that is configured to receive one or more electrical devices, such as plug modules (not shown). For example, as shown, the cavity 132 of the electrical device insert 130 may be configured to receive one or more types of electrical receptacle plug modules. This may allow the electrical receptacle assembly 100 to be installed and used in electrical systems having different plug type requirements. A plug module installed in the cavity 132 of the electrical device insert 130 may be electrically connected to a source of power, such as alternating current (AC) power source, for example via the yoke 120.

Figure 4:
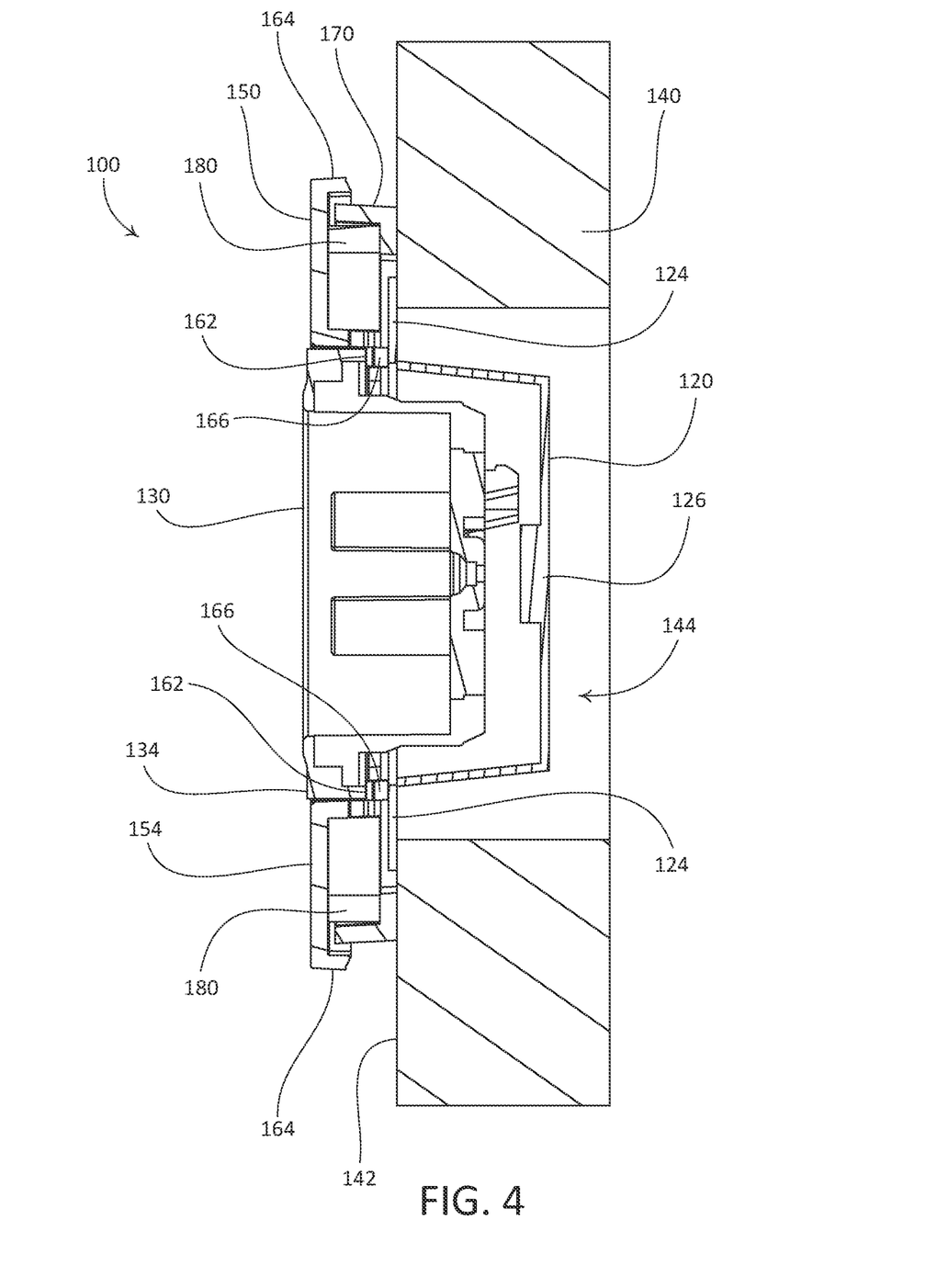
FIG. 4 is a side section view of the example electrical receptacle assembly illustrated in FIG. 1.

The electrical device insert 130 may be configured to attach to the yoke 120. For example, the yoke 120 may include a strap 126 to which the electrical device insert 130 may be attached, for instance using a fastener such as a screw (not shown). When the electrical device insert 130 is attached to the yoke 120, at least a portion of the electrical device insert 130 may protrude beyond the surface 142 of the wall 140, for example as shown in FIGS. 1 and 4. For example, as shown, when the electrical device insert 130 is attached to the yoke 120, an outer surface 134 of the electrical device insert 130 may be spaced outward from the surface 142 of the wall 140. The outer surface 134 may alternatively be referred to as a front surface of the electrical device insert 130.

As shown in FIG. 2, the example faceplate assembly 110 may include a faceplate 150, an adapter 170, and may optionally include a spacer 180. The spacer 180 may be configured as a biasing member, as described elsewhere herein. One or more components of the faceplate assembly 110 may be configured to cause the faceplate 150 to be biased outward relative to a structure to which the electrical receptacle assembly 100 is installed, for instance the wall 140, such that the faceplate 150 is spaced from the surface 142 of the wall 140. In this regard, the faceplate 150 may be referred to as an outward-biasing or outward-biased faceplate. Outward bias of the faceplate 150 relative to a structure may allow one or more portions of the faceplate 150 to align with one or more other components of the electrical receptacle assembly 100, such as the electrical device insert 130.

The faceplate 150 may be referred to as an electrical receptacle faceplate, and may be made of any suitable material, such as plastic. For example, as shown in FIGS. 3A-3D, the faceplate 150 includes a plate 152 that defines an outer surface 154 of the faceplate 150 and an opposed inner surface 156 of the faceplate. The outer surface 154 may alternatively be referred to as a front surface of the faceplate 150. The faceplate 150 may define an opening 158 that extends through the plate 152. The opening 158 may be configured to at least partially receive the electrical device insert 130. For example, as shown, the faceplate 150 includes inner walls 160 that extend around, and bound, a perimeter of the opening 158. The inner walls 160 extend rearward from the inner surface 156 of the plate 152. In accordance with the example faceplate 150, the opening 158 is square, defining four inner corners 159. However, it should be appreciated that the faceplate 150 is not limited to the illustrated square opening, and that the geometry of the opening may be otherwise configured.

The faceplate 150 may be configured to abut the electrical device insert 130 when the faceplate 150 is biased outward relative to the wall 140. For instance, the faceplate 150 may define one or more abutment surfaces that are configured to abut corresponding portions of the electrical device insert 130 such that the outer surface 134 of the electrical device insert 130 is proud relative to, or substantially flush with, the outer surface 154 of the faceplate 150.

For example, as shown, the faceplate 150 may define one or more ledges 161 that are spaced inward from the outer surface 154 of the faceplate 150. The ledges 161 may define respective abutment surfaces that are configured to abut the electrical device insert 130 when the faceplate 150 is biased outward relative to the wall 140. The illustrated faceplate 150 includes four ledges 161 defined at corresponding inner corners 159 of the opening 158. As shown, each ledge 161 may define one or more abutment surfaces 162, such as a pair of abutment surfaces 162, which are raised relative to outward-facing surfaces of the corresponding ledges 161.

As shown, the inner walls 160 may extend from the inner surface 156 of the faceplate 150 to the ledges 161. It should be appreciated that the faceplate 150 is not limited to the illustrated number or arrangement of ledges 161 and/or abutment surfaces 162, and more generally is not limited to the illustrated configuration of abutment surfaces 162. The abutment surfaces 162 may be spaced from the outer surface 154 of the faceplate 150 such that, when the faceplate 150 is biased outward such that one or more of the abutment surfaces 162 abut corresponding portions of the electrical device insert 130, the outer surface 134 of the electrical device insert 130 may align proud of, or may align substantially flush with, the outer surface 154 of the faceplate 150. The illustrated faceplate further includes outer walls 164 that extend rearward from the inner surface 156 of the plate 152 along an outer perimeter of the plate 152.

The adapter 170 may be configured to be disposed between the faceplate 150 and a structure to which the electrical receptacle assembly 100 is installed, such as the wall 140. The adapter 170 may be made of any suitable material, such as plastic. As shown, the adapter 170 includes outer walls 172. The outer walls 172 may define an outer perimeter of the adapter 170. The adapter 170 may be configured such that a rear surface 174 defined by the outer walls 172 abuts the surface 142 of the wall 140 when the electrical receptacle assembly 100 is installed in the wall 140. The outer walls 172 may be of sufficient height (e.g., defined along a direction that extends perpendicular to the rear surface 174) such that the outer walls 172 may at least partially surround a portion of the electrical device insert 130 when the electrical receptacle assembly 100 is installed, for instance as shown in FIG. 4.

The outer walls 172 may be of sufficient length (e.g., defined between corners where the outer walls 172 intersect) such that, when the electrical receptacle assembly 100 is installed, the walls 172 surround but do not contact the yoke 120 and the inner walls 160 of the faceplate 150, and the outer walls 172 are recessed relative to the outer walls 164 of the faceplate 150. Stated differently, the outer walls 172 may bound an area that is larger than respective areas bound by the collar 124 of the yoke 120 and the inner walls 160 of the faceplate, but is smaller than an area bound by the outer walls 164 of the faceplate 150. In this regard, the inner walls 160 of the faceplate 150 fit within an area bound by the outer walls 172 of the adapter 170, and the outer walls 172 of the adapter 170 fit within an area bound by the outer walls 164 of the faceplate 150. As shown, the outer walls 172 are of equal length, such that the adapter 170 defines a square shape. However, it should be appreciated that the adapter 170 is not limited to the illustrated square-shaped outer perimeter. The adapter 170 may be configured to receive at least a portion of the spacer 180. For example, as shown, the adapter 170 includes a ledge 176 that extends around an inner perimeter of the outer walls 172. The spacer 180 may be disposed into the adapter 170 such that the spacer abuts the ledge 176, for example when the electrical receptacle assembly 100 is in an installed configuration (e.g., as shown in FIG. 1).

The faceplate assembly 110 may include one or more biasing members that may be configured to cause the faceplate 150 to be biased outward relative to the wall 140, such that the faceplate 150 is spaced from the surface 142 of the wall 140. The one or more biasing members may cause the faceplate 150 to abut the electrical device insert 130.

For example, as shown, the faceplate 150 may include one or more resilient fingers 166 that are configured to abut and deflect against the collar 124 of the yoke 120, thereby causing one or more of the abutment surfaces 162 of the faceplate 150 to be biased against corresponding portions of the electrical device insert 130. As shown, the faceplate 150 includes a plurality of fingers 166 that may referred to as first biasing members of the faceplate assembly 110.

In accordance with the illustrated faceplate 150, each finger 166 is defined by a beam that is cantilevered to one of the ledges 161, and that extends from a corresponding inner corner 159 along a perimeter of the opening 158. As shown, each finger 166 is angularly offset inwardly relative to the outer surface 154 of the faceplate 150, for example as shown in FIGS. 3E-3H. Further in accordance with the illustrated faceplate 150, two fingers 166 extend from each ledge 161, at right angles to each other, and parallel to corresponding ones of the inner walls 160 of the faceplate 150.

When the faceplate assembly 110 is installed in the wall 140, one or more of the plurality of fingers 166 may resiliently deflect against the yoke 120, which may cause the one or more fingers 166 to apply biasing forces against the yoke 120. These forces may cause the faceplate 150 to be biased outward relative to the surface 142 of the wall 140, for instance such that one or more abutment surfaces 162 of the faceplate 150 abut corresponding portions of the electrical device insert 130. This may operate to securely hold the faceplate 150 in position against the electrical device insert 130, and/or may maintain parallel alignment between the outer surface 154 of the faceplate and the outer surface 134 of the electrical device insert 130.

The faceplate assembly 110 may include one or more additional biasing members. For example, the faceplate assembly 110 may optionally include a spacer 180 that may be referred to as a second biasing member of the faceplate assembly 110. The illustrated spacer 180 includes walls 182 that may define an outer perimeter of the spacer 180. As shown, the walls 182 are of equal length (e.g., defined between corners where the outer walls 182 intersect), such that the spacer 180 defines a square shape. However, it should be appreciated that the spacer 180 is not limited to the illustrated square-shaped outer perimeter. The walls 182 of the illustrated spacer 180 define respective lengths such that the walls 182 of the spacer 180 may fit within the outer walls 172 of the adapter 170.

The spacer 180 may be made of a resilient material, such as compressible foam. In this regard, the spacer 180 may be configured to be compressed between the adapter 170 and the faceplate 150. The walls 182 of the spacer 180 may define an inner abutment surface 184 that is configured to abut the ledge 176 of the adapter 170, and may define an opposed outer abutment surface 186 that is configured to abut the inner surface 156 of the faceplate 150. One or both of the inner abutment surface 184 and the outer abutment surface 186 may be configured to adhere to the adapter 170 and to the inner surface 156 of the faceplate 150, respectively, for example using double-sided adhesive. The walls 182 of the illustrated spacer 180 are of a height (e.g., defined along a direction that extends perpendicular to the inner and outer abutment surfaces 184, 186) such that the walls 182 protrude outward beyond the outer walls 172 of the adapter 170 when the inner abutment surface 184 abuts the ledge 176 of the adapter 170. In this regard, when the spacer 180 is seated in the adapter 170, the outer abutment surface 186 is spaced outwardly from corresponding edge surfaces of the outer walls 172 of the adapter 170.

When compressed between the adapter 170 and the faceplate 150, with the rear surface 174 of the outer walls 172 of the adapter 170 abutting the surface 142 of the wall 140, the spacer 180 may apply biasing forces against the ledge 176 and the inner surface 156 of the faceplate 150. These forces may cause the faceplate 150 to be biased outward relative to the surface 142 of the wall 140, for instance such that one or more of the abutment surfaces 162 of the faceplate 150 abut corresponding portions of the electrical device insert 130, and may further cause the rear surface 174 of the adapter 170 to be biased against the surface 142 of the wall 140. The biasing forces may allow the faceplate assembly 110 to compensate for one or more anomalies of the surface 142 of the wall 140, while maintaining parallel alignment between the outer surface 154 of the faceplate and the outer surface 134 of the electrical device insert 130.

Figure 5:
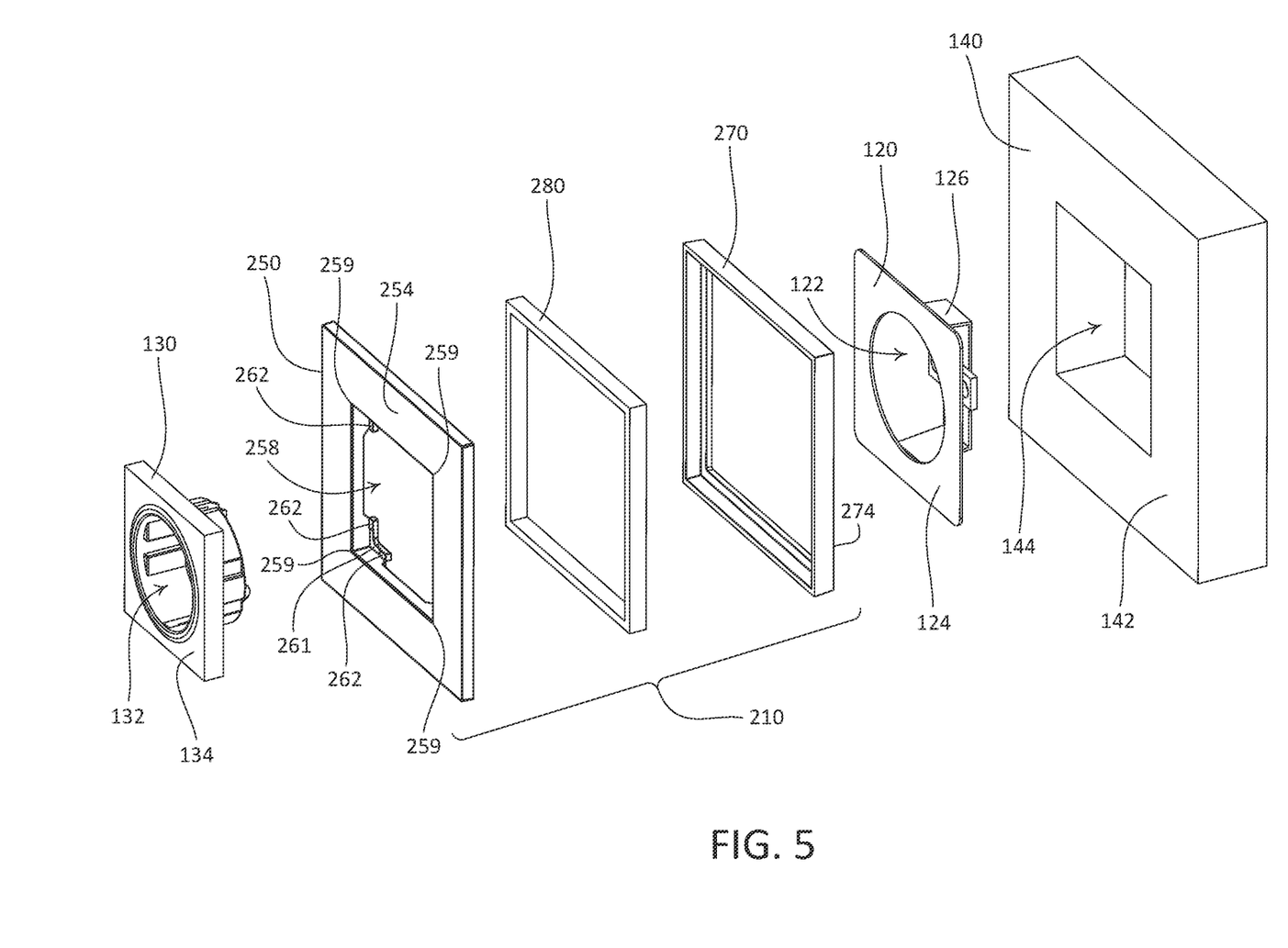
FIG. 5 is an exploded view of another example electrical receptacle assembly.
Figure 6:
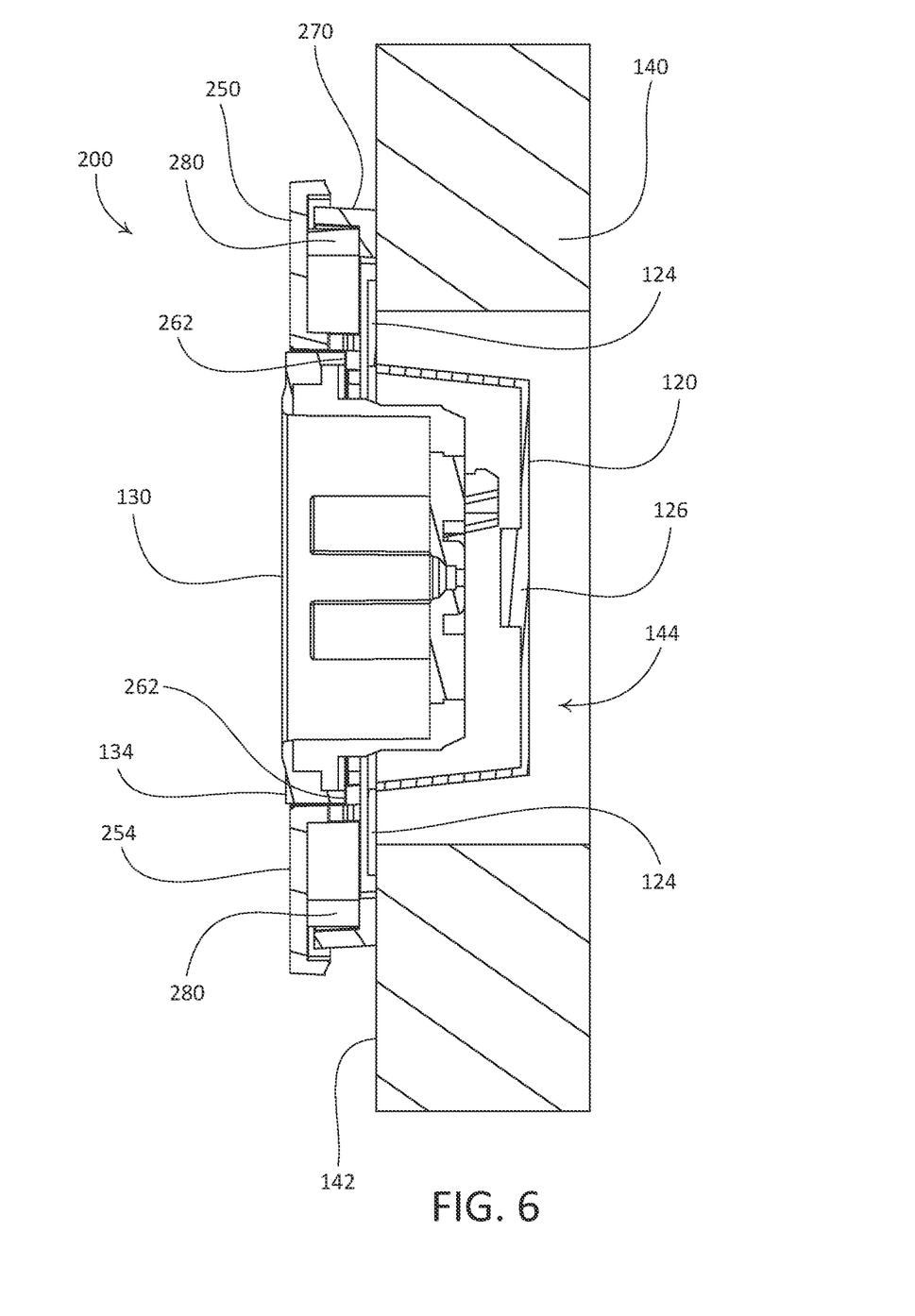
FIG. 6 is a side section view of the example electrical receptacle assembly illustrated in FIG. 5.

FIGS. 5 and 6 depict another example electrical receptacle assembly 200. As shown, the electrical receptacle assembly 200 may include an example faceplate assembly 210, a yoke 120, and an electrical device insert 130. The electrical receptacle assembly 200 may be installed in a structure, such as the wall 140 or other structure.

As shown in FIG. 5, the example faceplate assembly 210 may include a faceplate 250, an adapter 270, and one or more biasing members such as a spacer 280. One or more components of the faceplate assembly 210 may be configured to cause the faceplate 250 to be biased outward relative to a structure to which the electrical receptacle assembly 200 is installed, for instance the wall 140, such that the faceplate 250 is spaced from the surface 142 of the wall 140. In this regard, the faceplate 250 may be referred to as an outward-biasing or outward-biased faceplate. Outward bias of the faceplate 250 relative to a structure may allow one or more portions of the faceplate 250 to align with one or more other components of the electrical receptacle assembly 200, such as the electrical device insert 130.

The faceplate 250 may be referred to as an electrical receptacle faceplate, and may be made of any suitable material, such as plastic. The faceplate 250 may be constructed similarly to the faceplate 150, for example omitting the fingers 166. For example, as shown, the faceplate 250 may define one or more ledges 261 that are spaced inward from an outer surface 254 of the faceplate 250. The ledges 261 may define respective abutment surfaces that are configured to abut the electrical device insert 130 when the faceplate 250 is biased outward relative to the wall 140. The illustrated faceplate 250 includes four ledges 261 (only one is shown) defined at corresponding inner corners 259 of an opening 258 that extends through the faceplate 250. Each ledge 261 may define one or more abutment surfaces 262, such as a pair of abutment surfaces 262, which are raised relative to outward-facing surfaces of the corresponding ledges 261.

The faceplate 250 may be configured to abut the electrical device insert 130 when the faceplate 250 is biased outward relative to the wall 140. For instance, the abutment surfaces 262 may be spaced from the outer surface 254 of the faceplate 250 such that, when the faceplate 250 is biased outward such that one or more of the abutment surfaces 262 abut corresponding portions of the electrical device insert 130, the outer surface 134 of the electrical device insert 130 may align proud of, or may align substantially flush with, an outer surface 254 of the faceplate 250.

The adapter 270 may be constructed similarly to the adapter 170, and may be configured to be disposed between the faceplate 250 and a structure to which the electrical receptacle assembly 200 is installed, such as the wall 140. The spacer 280 may be constructed similarly to the spacer 180, and may be configured to cause the faceplate 250 to be biased outward relative to the wall 140, such that the faceplate 250 is spaced from the surface 142 of the wall 140. The spacer 280 may be referred to as a biasing member of the faceplate assembly 210.

When compressed between the adapter 270 and the faceplate 250, the spacer 280 may apply biasing forces against the adapter 270 and the faceplate 250. These biasing forces may cause the faceplate 250 to be biased outward relative to the surface 142 of the wall 140, for instance such that one or more of the abutment surfaces 262 of the faceplate 250 abut corresponding portions of the electrical device insert 130. The biasing forces may further cause a rear surface 274 of the adapter 270 to be biased against the surface 142 of the wall 140. This may allow the faceplate assembly 210 to compensate for one or more anomalies of the surface 142 of the wall 140, while maintaining parallel alignment between the outer surface 254 of the faceplate and the outer surface 134 of the electrical device insert 130.

It should be appreciated that faceplate assemblies, such as the example faceplate assemblies 110 and 210 illustrated and described herein, are not limited to use with other components of the illustrated electrical receptacle assemblies 100, 200. For example, as shown, the faceplate assemblies 110 and 210 are configured to cooperate with the illustrated yoke 120 and electrical device insert 130 to bias the respective faceplates 150, 250 outward relative to structure. However, one or more components of the respective faceplate assemblies may be alternatively configured to cooperate with the yoke of a different electrical device, such as the yoke of a standard single pole single throw (SPST) maintained switch for example, to bias the faceplate outward relative to structure.

The invention claimed is:

1. An electrical faceplate assembly, comprising:
a yoke physically couplable to an underlying structure, the yoke including a receiver portion to physically couple to an electrical device insert;
a faceplate assembly that includes a faceplate member having a front surface, a rear surface, and an external perimeter, the faceplate member including:
an aperture extending from the front surface of the faceplate member to the rear surface of the faceplate member;
a peripheral wall extending from the rear surface of the faceplate member, the peripheral wall disposed about at least a portion of the perimeter of the aperture; and
a plurality of biasing members, each of the plurality of biasing members extending from the peripheral wall at least partially into the aperture;
each of the plurality of biasing members to exert a biasing force that displaces the faceplate assembly away from the underlying structure; and
each of the plurality of biasing members to further contact the electrical device insert when the electrical device insert is physically coupled to the yoke such that the front surface of the faceplate remains flush with a front surface of the electrical device insert.

2. The electrical faceplate assembly of claim 1 wherein the yoke includes a yoke flange disposed about a perimeter of the receiver portion.

3. The electrical faceplate assembly of claim 2, each of the plurality of biasing members to contact a flange disposed about the electrical device insert such that when the electrical device insert is physically coupled to the yoke, each of the plurality of biasing members exerts a force against the yoke flange that displaces the faceplate member toward the electrical device insert flange.

4. The electrical faceplate assembly of claim 3 wherein each of the plurality of biasing members further comprises an abutment surface that abuts a rear surface of the flange disposed about the electrical device insert.

5. The electrical faceplate assembly of claim 1 wherein the faceplate assembly further comprises an adapter member disposed proximate the yoke.

6. The electrical faceplate assembly of claim 5 wherein the faceplate assembly further comprises a spacer member disposed between the faceplate member and the adapter member.

7. The electrical faceplate assembly of claim 6 wherein the spacer member comprises a compressible foam spacer member.

8. The electrical faceplate assembly of claim 6 wherein the faceplate member further comprises an outer wall disposed about the external perimeter of the faceplate member and extending from the rear surface of the faceplate member.

9. The electrical faceplate assembly of claim 8 wherein the spacer member fits inside the outer wall extending from the rear surface of the faceplate member.

10. The electrical faceplate assembly of claim 9 wherein the adapter member includes a front surface and a rear surface, the front surface including an outer wall disposed about an external perimeter of the adapter member.

11. The electrical faceplate assembly of claim 10 wherein the spacer member fits inside the outer wall extending from the front surface of the adapter member.

12. The electrical faceplate assembly of claim 1 wherein faceplate aperture comprises a rectangular aperture.

13. The electrical faceplate assembly of claim 12 wherein faceplate aperture comprises a square aperture.

14. The electrical faceplate assembly of claim 12 wherein each of the plurality of biasing members comprises an "L-shaped" biasing member, each of the plurality of biasing members disposed in a respective corner of the rectangular aperture in the faceplate member.

15. The electrical faceplate assembly of claim 1 wherein the plurality of biasing members comprises compressible foam biasing members.

* * * * *